United States Patent
Krug

(10) Patent No.: US 8,973,560 B2
(45) Date of Patent: Mar. 10, 2015

(54) DUAL FUEL SUPPLY SYSTEM FOR A DIRECT-INJECTION SYSTEM OF A DIESEL ENGINE WITH ON-BOARD MIXING

(75) Inventor: Uwe Alexander Krug, Criesbach (DE)

(73) Assignee: DGC Industries Pty Ltd, Geeling, Melbourne, Victoria (AU)

( * ) Notice: Subject to any disclaimer, the term of this patent is extended or adjusted under 35 U.S.C. 154(b) by 104 days.

(21) Appl. No.: 13/642,340

(22) PCT Filed: Apr. 20, 2011

(86) PCT No.: PCT/AU2011/000455
§ 371 (c)(1),
(2), (4) Date: Dec. 26, 2012

(87) PCT Pub. No.: WO2011/130791
PCT Pub. Date: Oct. 27, 2011

(65) Prior Publication Data
US 2013/0125867 A1    May 23, 2013

(30) Foreign Application Priority Data
Apr. 20, 2010    (AU) ................ 2010901648

(51) Int. Cl.
*F02D 19/06*    (2006.01)
*F02M 37/00*    (2006.01)
(Continued)

(52) U.S. Cl.
CPC ....... *F02D 19/0642* (2013.01); *F02M 37/0088* (2013.01); *F02M 43/00* (2013.01);
(Continued)

(58) Field of Classification Search
CPC . F02D 19/06; F02D 19/0642; F02D 19/0647; F02D 19/08; F02D 3/06; F02B 3/06
USPC ....... 123/1 A, 27 GE, 294, 304, 575; 701/103
See application file for complete search history.

(56) References Cited

U.S. PATENT DOCUMENTS

| 4,520,766 A | 6/1985 | Akeroyd |
| 4,535,728 A | 8/1985 | Batchelor |
| 5,408,957 A | 4/1995 | Crowley |
| 6,234,151 B1 | 5/2001 | Eck |
| 6,626,162 B2 | 9/2003 | Shelor et al. |

(Continued)

FOREIGN PATENT DOCUMENTS

| EP | 1785618 | 5/2007 |
| GB | 1252458 | 11/1971 |

(Continued)

*Primary Examiner* — Noah Kamen
*Assistant Examiner* — Grant Moubry
(74) *Attorney, Agent, or Firm* — Shoemaker and Mattare

(57) ABSTRACT

The present invention is directed to a dual fuel supply system for supplying fuel to a direct-injection system of a diesel engine. The dual fuel supply system includes a diesel supply system to supply diesel to the direct-injection system; and a mixed fuel supply system that is operatively able to supply a liquid fuel premixture of diesel and liquefied gaseous fuel to the direct-injection system at a supply pressure within a fuel demand pressure range of the direct-injection system and at a corresponding temperature range that retains the fuel premixture below its vapor temperature as it flows through the fuel path of the direct-injection system and the diesel engine. The dual fuel supply system is configured to permit selective change over between the diesel supply system and the mixed fuel system to supply the direct-injection system selectively with either diesel or liquid fuel premixture respectively.

22 Claims, 9 Drawing Sheets

(51) Int. Cl.
*F02M 43/00* (2006.01)
*F02M 53/00* (2006.01)
*F02M 55/00* (2006.01)
*F02D 19/08* (2006.01)
*F02M 63/02* (2006.01)

(52) U.S. Cl.
CPC .............. *F02M 53/00* (2013.01); *F02M 55/00* (2013.01); *F02D 19/0647* (2013.01); *F02D 19/0684* (2013.01); *F02D 19/0689* (2013.01); *F02D 19/0694* (2013.01); *F02D 19/081* (2013.01); *F02M 63/0275* (2013.01); *Y02T 10/36* (2013.01)
USPC ....... 123/575; 123/1 A; 123/27 GE; 123/294; 123/304; 701/103

(56) References Cited

U.S. PATENT DOCUMENTS

| | | | |
|---|---|---|---|
| 7,222,015 B2 * | 5/2007 | Davis et al. | 701/103 |
| 7,509,209 B2 * | 3/2009 | Davis et al. | 701/103 |
| 2004/0111210 A1 * | 6/2004 | Davis et al. | 701/103 |
| 2009/0126691 A1 * | 5/2009 | Bach | 123/480 |
| 2010/0324801 A1 * | 12/2010 | Cippitani | 701/103 |

FOREIGN PATENT DOCUMENTS

| | | |
|---|---|---|
| JP | 1318755 | 12/1989 |
| JP | 3189361 | 8/1991 |
| WO | 2008/036999 | 4/2008 |
| WO | 2008/141390 | 11/2008 |
| WO | 2010/121306 | 10/2010 |

* cited by examiner

DUAL FUEL SUPPLY SYSTEM FOR A DIRECT-INJECTION SYSTEM OF A DIESEL ENGINE WITH ON-BOARD MIXING

FIELD OF INVENTION

The present invention relates to fuel systems for diesel engines. In particular, the invention relates to a dual fuel supply system for a diesel engine having a direct-injection system. The invention extends to a diesel engine incorporating the dual fuel supply system and to a vehicle that incorporates a diesel engine having the dual fuel supply system.

This invention relates particularly but not exclusively to a dual fuel supply system for diesel engines of trucks. It will therefore be convenient hereinafter to describe the invention with reference to this example application. However, at the same time it must be recognized that the invention applies to other applications such as to diesel engines for light vehicles and to other types of internal combustion engines.

BACKGROUND TO THE INVENTION

Dual fuel supply systems for supplying a fuel mixture of diesel and gaseous fuel to diesel engines are known. Some dual fuel supply systems introduce the gaseous fuel into the air supply that leads to the combustion chamber. In US2005202021 a separate set of injectors introduce gaseous LPG into the combustion chamber, whereas in U.S. Pat. No. 5,408,957, U.S. Pat. No. 4,520,766, JP1318755 and GB1252458, gaseous LPG is mixed with air prior to introducing the air mixture to the combustion chamber.

The use of LPG and diesel at the same time has recently been addressed by the dual fuel system disclosed in WO 2008036999 where liquid LPG and diesel were mixed in a chamber prior to being introduced into the combustion chambers. However there are problems associated with the dual fuel system disclosed in WO 2008036999 in its application with different engine types.

OBJECT OF THE INVENTION

It is an object of the present invention to provide an alternative dual fuel supply system suitable for direct-injection systems that overcome at least in part the problems associated with prior art dual fuel supply systems.

SUMMARY OF THE INVENTION

In a first aspect the invention provides a dual fuel supply system for supplying fuel to a direct-injection system of a diesel engine, the dual fuel supply system including:

a diesel supply system to supply diesel to the direct-injection system; and a mixed fuel supply system that is operatively able to supply a liquid fuel mixture of diesel and liquefied gaseous fuel to the direct-injection system at a supply pressure within a fuel demand pressure range of the direct-injection system and at a corresponding temperature range that retains the fuel mixture below its vapor temperature as it flows through the fuel path of the direct-injection system and the diesel engine, in which the dual fuel supply system is configured to permit selective change over between the diesel supply system and the mixed fuel system to supply the direct-injection system selectively with either diesel or liquid fuel mixture respectively.

The diesel supply system is preferably operatively able to supply diesel to the direct-injection system at a supply pressure within the fuel demand pressure range of the direct-injection system and at a supply temperature range that corresponds with the supply temperature range of the mixed fuel supply system.

The mixed fuel supply system is preferably configured to regulate the supply pressure of the liquid fuel mixture within a pressure range towards a high end of the fuel demand pressure of the direct-injection system.

The mixed fuel supply system is preferably configured to supply the fuel mixture at a supply temperature that is sufficiently lower than the vapor temperature of the liquid fuel mixture at the supply pressure to compensate for heat that is introduced into the liquid fuel mixture by engine heat as it flows through the fuel path of the direct-injection system and the diesel engine.

The mixed fuel supply system preferably includes a first stage and a second stage, and the second stage of the mixed fuel supply system is preferably configured to regulate the supply pressure and the supply temperature at which the liquid fuel mixture is supplied to the direct-injection system.

The mixed fuel supply system is preferably configured to trigger the first stage of the mixed fuel supply system to supply liquid fuel mixture to the second stage of the mixed fuel supply system when the supply pressure in the second stage of the mixed fuel supply system drops towards a low end of the fuel demand pressure range of the direct-injection system.

The mixed fuel supply system preferably includes a pressure accumulator, and the first stage of the mixed fuel supply system is preferably triggered to charge the pressure accumulator with fuel mixture when the supply pressure in the second stage of the mixed fuel supply system drops towards a low end of the fuel demand pressure of the direct-injection system.

The second stage of the mixed fuel supply system preferably includes a mixed fuel supply circulation line that defines a mixed fuel supply circulation flow path that is connected or connectable inline in flow circulation with a high pressure pump and a fuel rail of the direct-injection system.

An overflow line of the high pressure pump of the direct-injection system is preferably connected in flow communication with the mixed fuel supply circulation line.

The mixed fuel supply circulation line preferably defines a mixed fuel supply circulation flow path that has a flow path volume to accommodate at least the amount of liquid fuel mixture that the diesel engine consumes at full load for one minute.

The second stage of the mixed fuel supply system preferably includes a circulation pump inline the mixed fuel supply circulation line. The circulation pump is preferably a variable speed controlled pump.

The second stage of the mixed fuel supply system preferably includes at least one fuel cooler inline the mixed fuel supply circulation line upstream from the direct injection-system and downstream from the circulation pump.

The at least one fuel cooler preferably includes an evaporator through which a refrigerant is passed, and a shut-off valve to shut-off the flow of refrigerant through the evaporator.

The second stage of the mixed fuel supply system preferably includes a temperature sensor upstream from the direct-injection system to measure the supply temperature of the liquid fuel mixture that is supplied to the direct-injection system.

The second stage of the mixed fuel supply system preferably includes a temperature sensor downstream from the direct-injection system to measure a temperature of the liquid fuel mixture that discharges from the direct-injection system into the mixed fuel supply circulation line.

The second stage of the mixed fuel supply system preferably includes a flow sensor to measure a flow rate of liquid fuel mixture circulating through the mixed fuel supply circulation line.

The second stage of the mixed fuel supply system preferably includes a fuel mixer inline the mixed fuel supply circulation line, said fuel mixer defines a mixing-chamber that is in flow communication with the mixed fuel circulation supply flow path. The mixed fuel pressure accumulator is preferably a bladder accumulator.

The second stage of the mixed fuel supply system preferably includes at least one pressure sensor upstream from the direct-injection system to measure the supply pressure of the liquid fuel mixture being supplied to the direct-injection system.

The second stage of the mixed fuel supply system preferably includes a mixed fuel supply line to connect the first stage of the mixed fuel supply system in flow communication with the second stage of the mixed fuel supply system, and in which the mixed fuel supply line joins the mixed fuel supply circulation line upstream from the circulation pump that is inline the mixed fuel supply circulation line.

The second stage of the mixed fuel supply system preferably includes a pressure regulating valve inline the mixed fuel supply line.

The second stage of the mixed fuel supply system preferably includes a fuel cooler inline the mixed fuel supply line.

The second stage of the mixed fuel supply system preferably includes a mixed fuel accumulator inline the mixed fuel supply line.

The first stage of the mixed fuel supply system preferably is a fuel-mixing system configured to mix diesel and liquefied gaseous fuel to form the liquid fuel mixture.

The fuel-mixing system is preferably configured to regulate a ratio of diesel to liquefied gaseous fuel of the liquid fuel mixture that is supplied to the second stage of the mixed fuel supply system at a ratio of between 10% and 50% parts per mass diesel to 90% and 50% parts per mass liquefied gaseous fuel.

The fuel-mixing system preferably includes a fuel mixer and a diesel delivery line and a liquefied gaseous fuel delivery line that are connected between the fuel mixer and a diesel reservoir and a liquefied gaseous fuel reservoir respectively.

The fuel-mixing system preferably includes a variable speed controlled pump inline the diesel delivery line and a variable speed controlled pump inline the liquefied gaseous fuel delivery line upstream from the mixer to regulate the ratio of diesel to liquefied gaseous fuel that is supplied to the mixer.

The fuel-mixing system preferably includes a diesel pressure accumulator inline the diesel delivery line and a liquefied gaseous fuel pressure accumulator inline the liquid gaseous fuel delivery line.

The diesel pressure accumulator preferably includes a diesel bladder accumulator and the liquefied gaseous fuel pressure accumulator includes liquefied gaseous fuel bladder accumulator.

The fuel-mixing system preferably includes a diesel booster pump inline the diesel delivery line upstream from the diesel bladder accumulator, and a liquefied gaseous fuel booster pump inline the liquefied gaseous fuel delivery line upstream from the liquefied gaseous fuel bladder accumulator.

The fuel-mixing system preferably includes a proportioning valve inline the diesel delivery line downstream from the diesel bladder accumulator, and a proportioning valve inline the liquefied gaseous fuel delivery line downstream from the liquefied gaseous fuel bladder accumulator.

The fuel-mixing system preferably includes a flow meter inline at least one of the diesel delivery line and the liquefied gaseous fuel delivery line.

The fuel-mixing system preferably includes a fuel cooler inline the diesel delivery line and a fuel cooler inline the liquefied gaseous fuel delivery line.

The second stage of the mixed fuel supply system preferably includes a mixed fuel bypass line selectively to bypass the direct-injection system.

The diesel supply system preferably includes a diesel supply circulation line that is connected or connectable in flow communication inline with the high pressure pump and the fuel rail of the direct-injection system.

The diesel supply system preferably includes at least one fuel cooler inline the diesel supply circulation line upstream from the indirect injection-system.

The diesel supply system preferably includes a diesel booster pump inline the diesel supply circulation line upstream from the at least one fuel cooler.

The diesel supply system preferably includes a diesel bypass selectively to bypass the direct-injection system.

The dual fuel supply system preferably includes a controller that is configured to control selectively the change over between the diesel supply system and the mixed fuel supply system.

The controller is preferably configured to flush the mixed fuel supply line with diesel before switching over from the mixed fuel supply system to the diesel system.

The controller is preferably configured to flush the mixed fuel supply line with diesel after the fuel-mixing system is charged by the first stage of the mixed fuel supply system with liquid fuel mixture.

The controller is preferably configured to flush the mixed fuel supply line with diesel before the diesel engine is stopped.

The controller is preferably configured to regulate the flow rate of the fuel mixture through the mixed fuel cooler to regulate the temperature of the fuel mixture.

The controller is preferably configured to open the diesel supply circulation line prior to opening the mixed fuel bypass line.

The controller is preferably configured to open the mixed fuel supply circulation line prior to opening the diesel bypass line.

The controller is preferably configured automatically to change over from the mixed fuel supply system to the diesel supply system when the pressure in the mixed fuel supply circulation loop drops below a set pressure threshold.

The controller is preferably configured to regulate a temperature of the liquefied gaseous fuel and the diesel fuel prior to mixing at temperatures that are sufficiently lower than the vapor temperature of the liquefied gaseous fuel at the mixing pressure, to compensate for heat that is added to the fuel mixture during mixing and when flowing to the mixed fuel supply circulation line.

The controller is preferably configured to monitor the temperature of the liquid fuel mixture in the mixed fuel supply circulation line, and to switch over to the diesel supply system if the temperature rises above a set temperature threshold.

The controller is preferably configured to monitor the temperature in the mixed fuel bypass loop, and if the temperature of the liquid fuel mixture in the mixed fuel bypass loop is above a set temperature threshold then to resist switching over from the diesel supply system to the mixed fuel supply system.

The controller is preferably configured to monitor the supply temperature of the diesel, and if the supply temperature of the diesel is above a set temperature threshold then to resist change over to the mixed fuel supply system.

The controller is preferably configured to trigger an alarm if the flow rate of diesel in the diesel supply circulation line or the flow rate of fuel mixture in the mixed fuel supply circulation line is below a set flow rate threshold.

The controller is preferably configured to alter the ratio of diesel to liquefied gaseous fuel to alter the vapor temperature of the fuel mixture at the supply pressure.

In a preferred form the dual supply system can be retrofitted as a kit to existing vehicles.

In a second aspect the invention provides a diesel engine that includes:

an direct-injection system; and a dual fuel supply system as defined above in accordance with the first aspect of the invention.

The dual fuel supply system preferably includes any one ore more of the optional features a defined above in accordance with the first aspect of the invention.

In a third aspect the invention provides a vehicle that includes:

a diesel engine having an direct-injection system; and a dual fuel supply system as defined above in accordance with the first aspect of the invention.

The dual fuel supply system preferably includes any one ore more of the optional features a defined above in accordance with the first aspect of the invention.

BRIEF DESCRIPTION OF THE DRAWINGS

In order that the present invention can be more readily understood reference will now be made to the accompanying drawings which illustrate preferred embodiments of the invention and wherein.

DETAILED DESCRIPTION OF THE PREFERRED EMBODIMENTS

Figure 1:
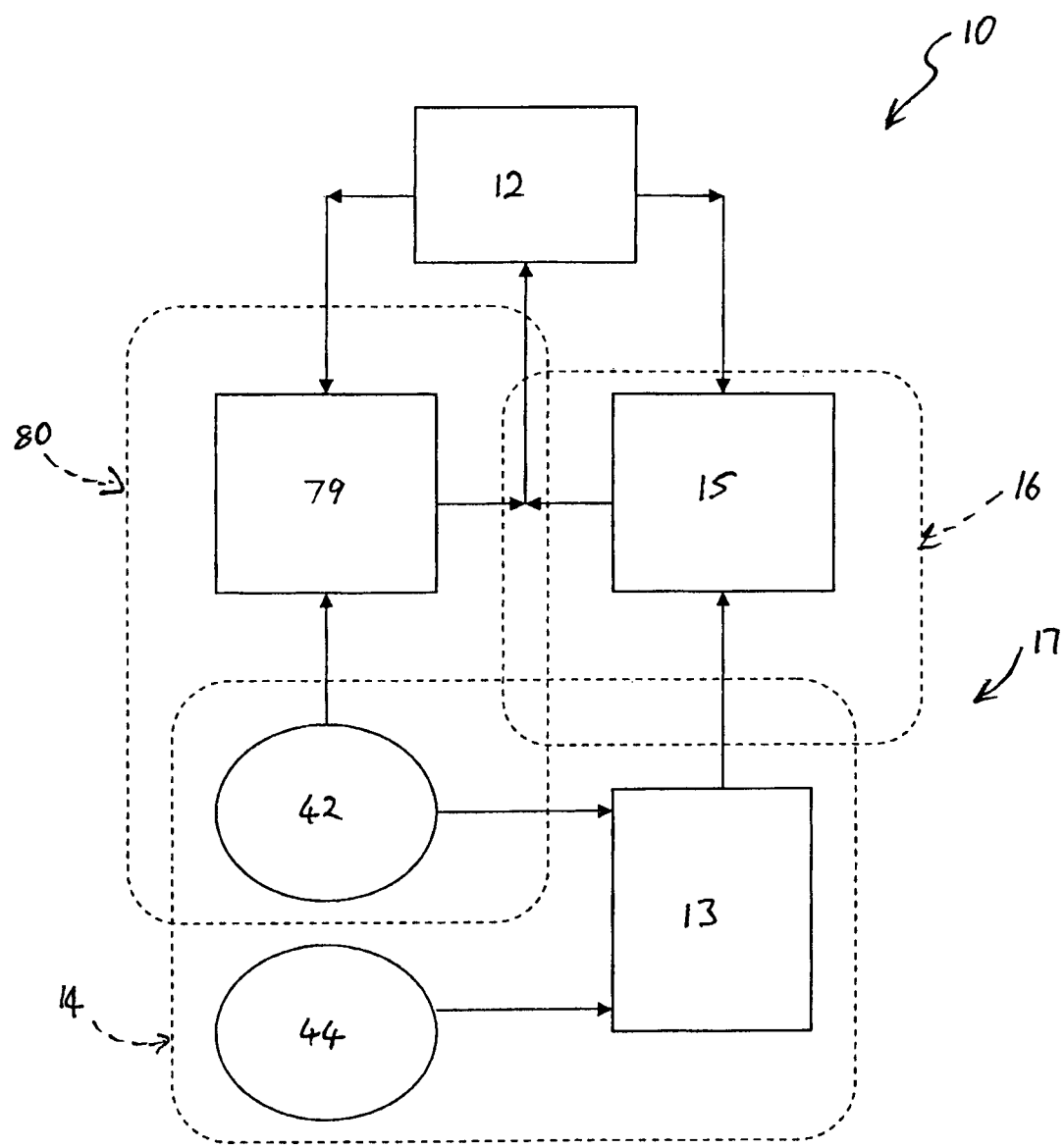
FIG. 1 is a schematic functional block diagram of a dual fuel supply system, in accordance with the invention.

Referring to FIG. 1, reference numeral 10 generally indicates a dual fuel supply system in accordance with the invention for supplying fuel to an direct-injection system (the injection system) 12 of a diesel engine (not shown). In this specification with direct-injection system is meant to include a high pressure pump having a low pressure intake side and a high pressure outlet side that supplies fuel at a relative high pressure to a fuel rail which supplies the fuel to injectors. The intake or low pressure side of a high pressure pump of a direct-injection system has an operative intake pressure of typically between 2 bar to 15 bar. The intake pressure range of the high pressure pump is herein referred to as the fuel demand pressure range of the direct-injection system.

Broadly, each of the embodiments described below includes two subsystems. One sub-system is a mixed fuel supply system 17 that includes a first stage 14 of the mixed fuel supply system 17 having a diesel reservoir or tank 42, a liquefied gaseous fuel reservoir or tank 44, and system components 13 for supplying a liquid fuel mixture to the second stage 16 of the mixed fuel supply system 17. The second stage 16 includes system components 15. The liquefied gaseous fuel is typically liquid petroleum gas (LPG), however, it will be appreciated that a dual fuel supply system, in accordance with the invention, can be configured for use with different types of liquefied gaseous fuel.

The mixed fuel supply system 17 is operatively able to supply the liquid fuel mixture of diesel and liquefied gaseous fuel to the direct-injection system at a supply pressure range that matches the fuel demand pressure range of the injection system 12 and at a corresponding temperature range that retains the fuel mixture below its vapor temperature as it flows through the fuel path of the direct-injection system 12 and the diesel engine.

Another subsystem of the dual fuel supply system 10 is a diesel supply system 80 and includes the diesel tank 42 and system components 79 for delivering diesel to the injection system 12 and circulating diesel to the tank 42.

The dual fuel supply system 10 includes conduits or lines that define various flow paths, and system components that regulate and control the active flow paths, flow rates, temperature, and pressure of the diesel or fuel mixture through the dual fuel supply system 11, as is explained in more detail below.

Moreover, the dual fuel supply system 10 is configured to permit selective change over between the diesel supply system 80 and the mixed fuel system 17 to supply the injection system 12 selectively with either diesel or liquid fuel mixture respectively.

Figure 2:
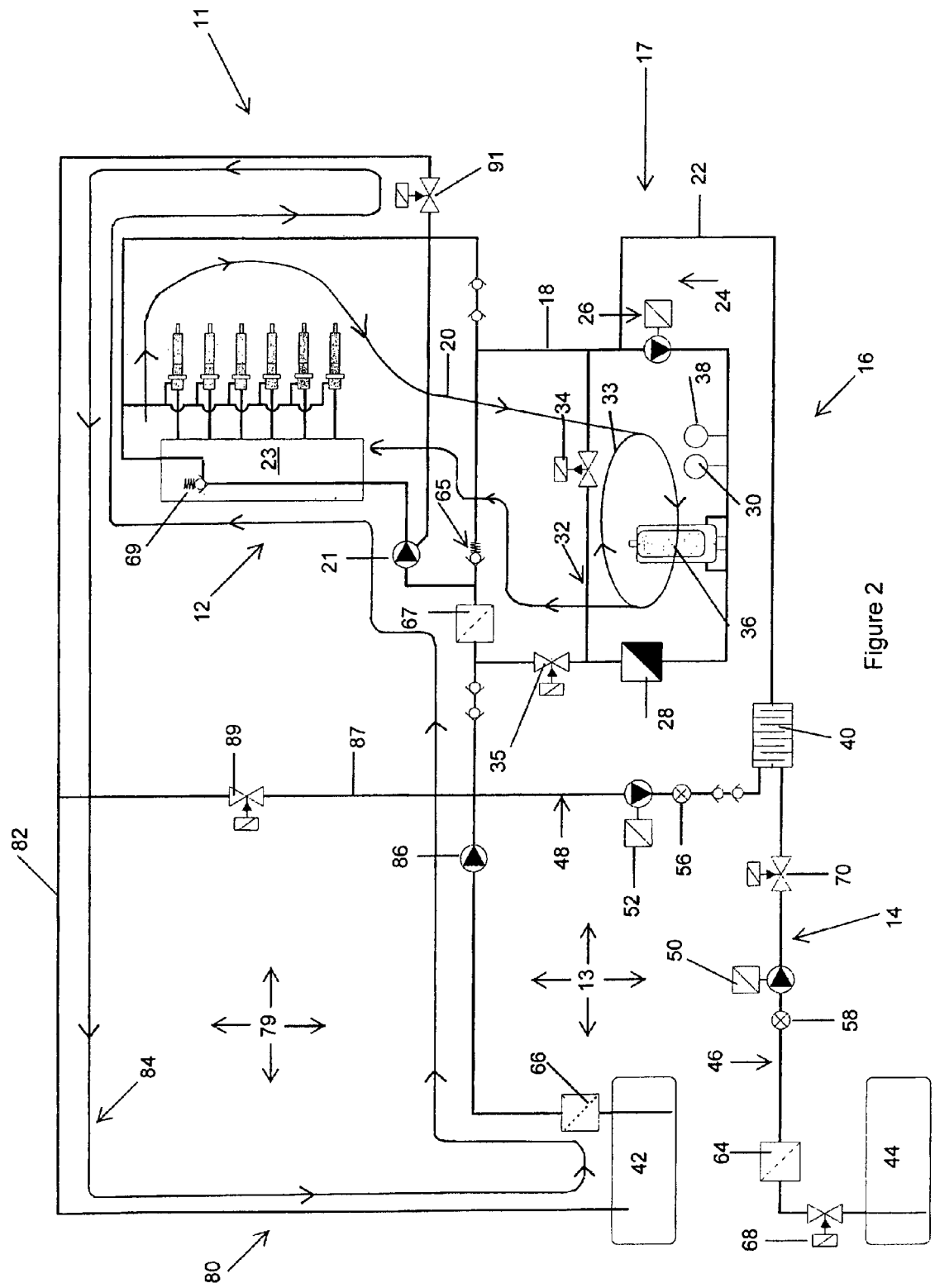
FIG. 2 is a schematic representation of a first embodiment of the dual fuel supply system.

FIG. 2 shows a schematic diagram of an embodiment 11 of the dual-fuel supply system. The dual fuel supply system 11 includes a mixed fuel system 17 that includes a first stage 14 to mix diesel and LPG to form the liquid fuel mixture, and a second stage 16 to supply the injection system 12 with the fuel mixture from the first stage 14 of the mixed fuel supply system 17. The second stage 16 of the mixed fuel supply system 17 forms a fuel-mixing system.

The second stage 16 of the mixed fuel supply system 17 includes a mixed fuel supply circulation line or loop 18 that defines a mixed fuel supply circulation flow path (see arrow 20). The mixed fuel supply circulation loop 18 is connected in flow communication inline with the high pressure pump 21 and fuel rail 23 that forms part of the injection system 12 for circulating fuel mixture through the fuel rail of the injection system 12.

A mixed fuel supply line 22 that defines a mixed fuel supply line flow path (see arrow 24) extends between the fuel-mixing system 14 and the mixed fuel supply circulation loop 18 to supply fuel mixture to the mixed fuel supply circulation loop 18 from the fuel-mixing system 14.

The second stage 16 of the mixed fuel supply system 17 includes a circulation pump 26 inline the mixed fuel supply circulation loop 18 and a fuel cooler 28 inline the mixed fuel supply circulation loop 18 upstream from the indirect injection-system 12 and downstream from the circulation pump 26. In this embodiment, the circulation pump 26 is a controllable variably speed pump and the fuel cooler includes an evaporator that is connected inline with the refrigerant line of the air conditioning system of the truck. However, it will be appreciated that the fuel cooler can be a stand alone fuel cooler.

A temperature sensor 30 is provided upstream from the direct-injection system 12, to measure the supply temperature of the liquid fuel mixture that is supplied to the injection system 12.

The dual fuel supply system 11 also includes a mixed fuel bypass line 32 selectively to isolate the direct-injection system 12 from the mixed fuel supply circulation line 18 (see arrow 33).

Valves in the form of a controllable normally closed solenoid valve 35 and normally opened solenoid valve 34 are provided inline the mixed fuel circulation supply loop 18 and the bypass line 32 respectively, selectively to divert fuel mixture through either flow path 20 or 33.

The second stage 16 of the mixed fuel supply system 17 also includes a pressure accumulator 36 inline the mixed fuel circulation supply loop 18 downstream from the direct-injection system 12 and upstream from the circulation pump 26.

The pressure accumulator 36 is in the form of a bladder accumulator.

To this end, the second stage 16 of the mixed fuel supply system 17 includes at least one pressure sensor 38 upstream from the direct-injection system 12 to measure the supply pressure of the liquid fuel mixture being supplied to the direct-injection system 12.

The fuel-mixing system 14 is configured to regulate a ratio of diesel to LPG of the liquid fuel mixture that is supplied to the second stage 16 of the mixed fuel supply system 17. The ratio can be between about 10% and 50% parts per mass diesel to between 90% and 50% parts per mass LPG.

The fuel-mixing system 14 includes a fuel mixer 40 to receive the diesel and the LPG from a diesel supply and a LPG supply. The fuel mixer 40 can be in the form of an inline static mixer, a mixing chamber, a T- or Y-piece joint with some tubing at the outlet to allow mixing, or the like.

The diesel supply includes the diesel reservoir or tank 42 and the LPG supply includes the LPG reservoir or tank 44.

A diesel delivery line 48 and a LPG delivery line 46 are connected to the diesel tank and the LPG tank and the mixer 40 respectively.

Variable speed controlled pumps 50 and 52 are provided inline the LPG delivery line 46 and inline the diesel delivery line 48 respectively upstream from the mixer to regulate the ratio of diesel to LPG that is supplied to the fuel mixer 40.

The fuel-mixing system 14 includes flow meters 56 and 58 inline the diesel delivery line and the LPG delivery line respectively.

The fuel-mixing system 14 also includes fuel filters 64 and 66 towards back ends of the LPG delivery line 46 and the diesel delivery line 48.

Two valves in the form of controllable normally closed solenoid valves 68 and 70 are provided towards either end of the LPG delivery line 46.

The dual fuel supply system 11 is configured selectively to change over between the diesel supply system 80 and mixed fuel supply system 17 selectively to supply either diesel only or fuel mixture to the injection system 12.

The diesel supply system 80 is operatively able to supply diesel to the direct-injection system 12 at a supply pressure within the fuel demand pressure range of the direct-injection system 12

The diesel supply system 80 includes a diesel supply circulation line or loop 82 (see arrow 84) that is connected in flow communication inline with the direct-injection system 12.

A diesel circulation pump 86 is provided inline the diesel circulation supply loop 82 upstream from the high pressure pump 21. The diesel circulation pump 86 can be the existing onboard low pressure fuel feed pump of the vehicle. Diesel passes fuel filter 67 and is pumped via pump 21 to the direct injection system 12. There is a pressure relief valve 65 for mixed fuel in the circulation loop 20. There is also a pressure relief valve 69 for overflow of fuel from the fuel rail 23.

The diesel supply system 80 includes a diesel bypass line 87 selectively to isolate the injection system 12 from the diesel circulation supply loop 18.

The dual fuel supply system 11 also includes a controller (not shown) that is interfaced with the relevant system components, pumps, valves, coolers, and the like, of the dual fuel supply system 11 to control the flow, temperature and pressure of the fuels through the system. The controller is typically a dedicated logic controller or programmable logic controller.

In use, when the diesel engine is in operation, the injection system 12 is supplied with either diesel or liquid fuel mixture of diesel and LPG.

When the fuel mixture is supplied to the injection-system 12 then fuel mixture circulates through the mixed fuel circulation supply loop 18 along flow path 20. The cooler 28 reduces the temperature of the circulating fuel mixture to maintain the liquid fuel mixture in a liquefied state at the fuel supply pressure of the injection system 12. The temperature sensor 30 measures the temperature of the circulating fuel mixture. At the same time the pressure sensor 38 measures the pressure of the circulating fuel mixture.

If the pressure of the circulating fuel mixture is within its required pressure range but its temperature increases beyond a maximum threshold temperature then the circulation rate of the fuel mixture through the cooler 28 can be increased by the circulating pump 26 through the cooler 28. Another way to control the temperature would be to circulate the fuel mixture at a constant rate, and to merely switch the fuel cooler on and off, as needed, to cool the fuel mixture.

The injection-system 12 uses fuel from the circulating fuel mixture that circulates in the mixed fuel circulation supply loop 18, which causes the supply pressure of the fuel mixture in the mixed fuel circulation loop 18 to drop over time. When the pressure of the circulating fuel mixture is reduced below a minimum threshold then the fuel-mixing system 14 is activated to supplement the mixed fuel circulating supply loop with fuel mixture from the fuel-mixing system 14.

When the fuel-mixing system 14 is activated, the two solenoid valves 68 and 70 are opened. Solenoid valve 68 is a safety cutout valve which is required in some countries like Australia. Solenoid valve 68 is not controlled by the dual fuel supply system controller, it is controlled independently by a separate safety device. This device detects impulses coming from the crankshaft sensor of the engine. Only if the safety device detects such impulses, which indicates that the engine is running, it opens valve 68 and 70 in the LPG delivery line and starts the two variable speed controlled pumps 50 and 52, and measures the flow rate of the diesel and LPG along their respective delivery lines 48 and 46 with the diesel flow meter 56 and the LPG flow meter 58 that is pumped from the diesel tank 42 and the LPG tank 44 to the mixer 40. The controller controls the diesel pump 52 and LPG pump 50 to supply the required ratio of diesel to LPG to mixer 40.

The low pressure diesel pump 86 and the diesel pump 52 may be replaced by a single stronger diesel pump to provide diesel at the desired pressure.

With pumps 52 and 50, the fuel-mixing system 14 delivers the diesel and LPG at a pressure that is sufficient to enter the mixed fuel circulation supply loop 18 and to charge the bladder accumulator 36 which increases the pressure of the circulating fuel mixture in the mixed fuel circulation supply loop 18. The pressure sensor 38 measures the pressure in the mixed fuel circulating supply loop 18, and when the pressure of the circulating fuel mixture reaches a maximum threshold then pumps 52 and 50 are switched off and valve 70 is closed.

The LPG pump 50 is switched off before the diesel pump 52 so that diesel is pumped into the mixed fuel supply line 22 before the fuel-mixing system 14 shuts down. This reduces the amount of LPG that is resident in the mixed fuel supply line 22 within which there is no active cooling when the fuel-mixing system is not active. In other words, the second stage 16 of the mixed fuel supply system 17 is at least partly flushed with diesel after each time that the fuel mixture was supplied to the second stage 16 of the mixed fuel supply system. Also, the mixed fuel supply system 17 is at least partly flushed with diesel before the diesel engine is switched off.

Meanwhile, diesel is circulating through the diesel bypass line 87, in particular in the case which the on-board diesel feed pump 86 is mechanically driven and can not be turned off. Diesel circulates via bypass line 87 with the diesel return valve 89 open to return diesel to the tank 42.

When the dual fuel supply system 11 changes over from the mixed fuel supply system 17 to the diesel supply system 80, then the controller opens valve 91 in the diesel circulating supply loop 82 and closes valve 89 in the diesel bypass line 87, to start circulating diesel through the diesel supply circulation line 82.

Subsequently, valve 35 in the mixed fuel circulation supply loop 18 is closed and valve 34 in the mixed fuel bypass line 32 is opened so that the fuel mixture bypasses the injection system 12.

Thus, while the diesel supply system 80 is supplying diesel to the injection system 12, fuel mixture is still being circulated in the mixed fuel bypass loop 33 through the cooler 28 to keep the resident fuel mixture in the mixed fuel circulation supply loop 18 at a sufficiently low temperature that prevents boiling of the liquid fuel mixture.

The controller is also configured automatically to change over from the mixed fuel supply system 17 to the diesel supply system 80 when the pressures in the mixed fuel supply circulation loop 18 drops below a set pressure threshold.

There are also safety measures built into the system, such as that the controller is configured to monitor the temperature of the liquid fuel mixture in the mixed fuel supply circulation line 18, and to switch over to the diesel supply system if the temperature rises above a set temperature threshold.

Further, the controller is configured to monitor the temperature in the mixed fuel bypass loop 32, and if the temperature of the liquid fuel mixture in the mixed fuel bypass loop 32 is above a set temperature threshold then to resist switching over from the diesel supply system 80 to the mixed fuel supply system 17.

In addition, the controller is configured to monitor the supply temperature of the diesel, and if the supply temperature of the diesel is above a set temperature threshold then to resist change over to the mixed fuel supply system 17.

The controller is configured to trigger an alarm if the flow rate of diesel in the diesel supply circulation line 82 or the flow rate of fuel mixture in the mixed fuel supply circulation loop 18 is below a set flow rate threshold.

As part of controlling the temperature, the ratio of diesel to liquefied gaseous fuel can be altered to offset the vapor temperature of the fuel mixture at the supply pressure.

Figure 3:
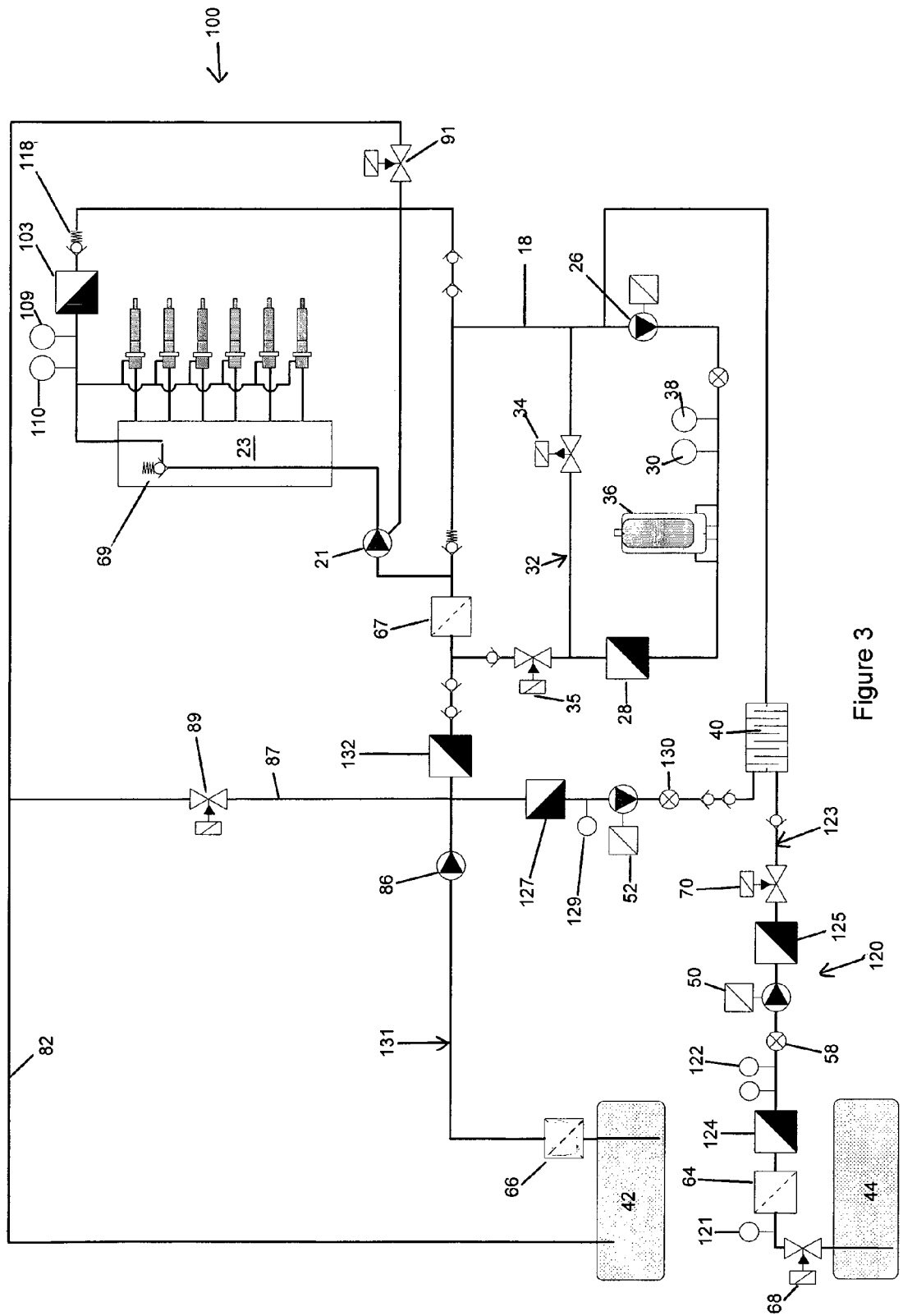
FIG. 3 is a schematic representation of a second embodiment of the dual fuel supply system the includes the first embodiment and additional system components.

FIG. 3 shows a dual fuel supply system 100 that is essentially identical to the dual fuel supply system 11 in FIG. 2, but includes additional system components.

The additional system components includes a flow meter 102 in the mixed fuel circulation supply loop 18; an additional cooler 103, additional temperature sensors 110, additional pressure sensor 109, and a pressure holding valve 118 in the overflow circuit after the injection system 12.

The fuel-mixing system 120 of the dual fuel supply system 100 also includes pressure sensors 121 and 122, coolers 124 and 125, and a flow meter 126 in the LPG delivery line 123.

The fuel-mixing system 120 also includes diesel fuel cooler 127, a temperature sensor 129 and flow meter 130 in the diesel delivery line 131.

There is also an additional fuel cooler 132 in the diesel-injection system fuel line downstream of pump 86 but upstream of fuel filter 67. The fuel cooler 132 serves to keep the diesel cool while the engine runs on diesel. If the fuel lines were not kept cool, LPG of the mixed fuel may form a gas when the fuel is switched to mixed fuel and it contacts the hot fuel lines. The additional fuel coolers may be constantly on or turned on for a short period prior to the fuel being switched from diesel to the mixed fuel.

The cooler 103 is common to the mixed fuel supply circulation line 18 and the diesel supply circulation line 82, and therefore retain the fuel fluidic path of the injection system 12 and the engine at a sufficient low temperature when the dual fuel supply system runs on diesel, so as to resist boiling of the fuel mixture when the fuel supply is changed over from the diesel supply system 80 to the mixed fuel supply system 17.

Also, with coolers 28 and 103 the temperature of the fuel, fuel mixture and/or diesel, is regulated at a sufficient low temperature that compensates for the additional temperature that is introduced into the fuel when it circulates through the fuel path of the diesel engine and injection system.

Where there are similar features in alternative embodiments as in the embodiment shown in FIG. 2, they have been given the same numbers to indicate their similarity and relevant description regarding these features of the embodiment shown in FIG. 2 also apply to the similarly numbered features shown in the alternative embodiments.

Figure 4:
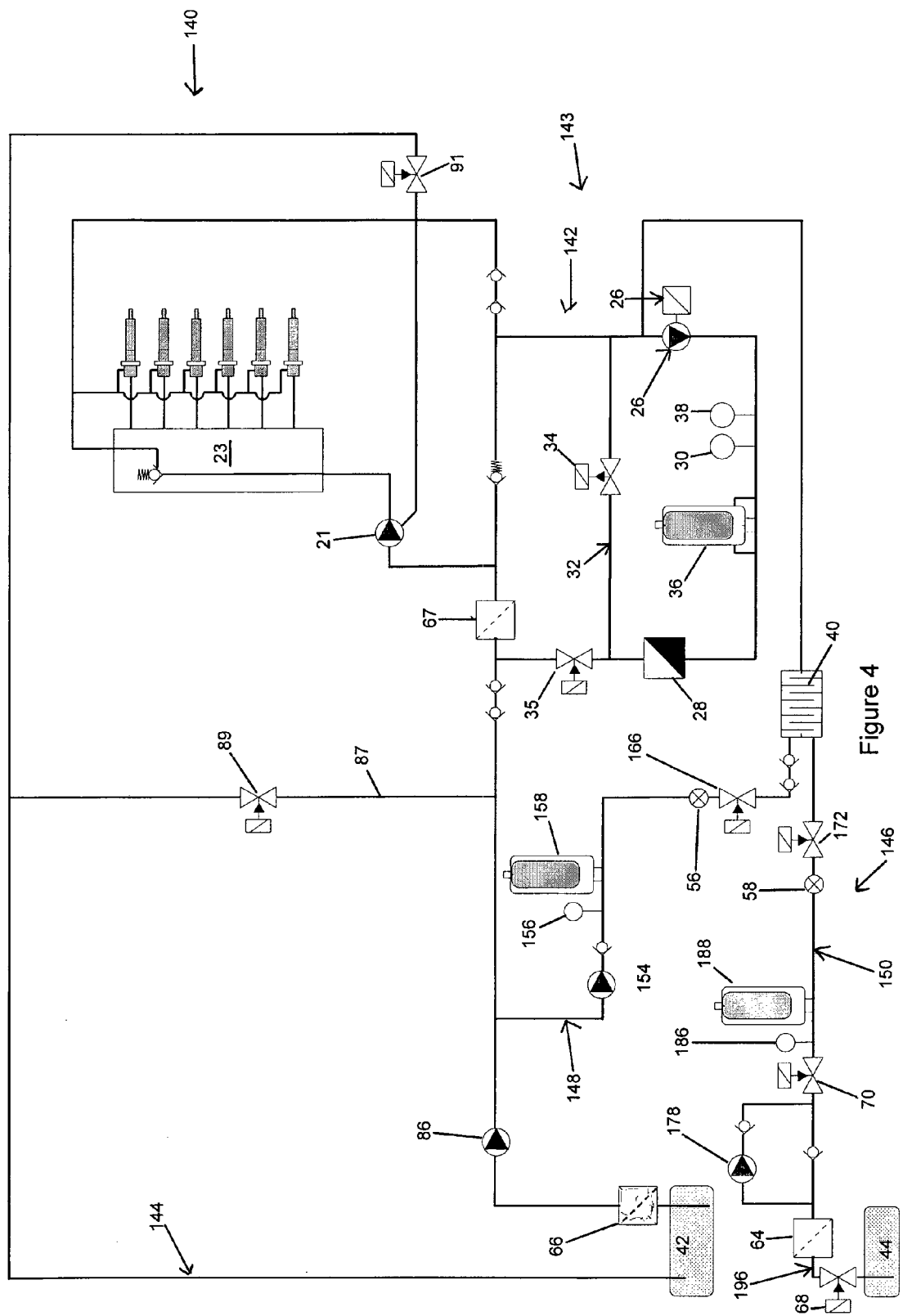
FIG. 4 is a schematic representation of a third embodiment of the dual fuel supply system.

FIG. 4 shows another embodiment of a dual fuel supply system 140, in accordance with the invention. The dual fuel supply system 140 includes a mixed fuel supply system 143 and a diesel supply system 144. The diesel supply system 144 is substantially identical to the diesel supply system 80 in FIG. 2.

The second stage 142 of the mixed fuel supply system 143 is substantially identical to the second stage 16 of the mixed fuel supply system 11 in FIG. 2.

However, the dual fuel supply system 143 includes a fuel-mixing system 146 that is different from the fuel-mixing system 14 in FIG. 2.

The fuel-mixing system 146 also includes a diesel delivery line 148 and a LPG delivery line 150 to supply diesel and LPG to a mixer 152.

The diesel delivery line 148 includes a diesel feed or booster pump 154 and a diesel bladder accumulator 158 downstream from the diesel booster pump 154. The diesel delivery line further includes a proportioning valve 166 upstream from the mixer 40. A pressure sensor 156 is provided inline the diesel delivery line 148.

Similarly, the LPG delivery line 150 includes a LPG feed or booster pump 178, a LPG bladder accumulator 188 downstream from the LPG booster pump 178, and a proportioning valve 172. A pressure sensor 186 a temperature sensor 192 are provided inline the LPG delivery line 150. A temperature sensor 192 may also be provided inline the LPG delivery line 150.

The LPG inside the LPG tank 44 is ordinarily stored in a pressurized state, and therefore if the pressure in the LPG tank 44 is adequate to charge the LPG bladder accumulator 188 then the LPG booster pump 180 is not used at such time. The flow of LPG from the LPG tank 44 directly to LPG bladder accumulator 188 along line section 196 is controlled by opening and closing of valve 70. Otherwise, the LPG booster pump 178 is activated to increase the supply pressure of the LPG to the LPG bladder accumulator 188.

Valve 68 is also used as an isolation valve similar to that shown in FIG. 2.

In use, when the pressure of the fuel mixture in the mixed fuel supply circulation line 18 falls below a supply pressure threshold, then the fuel-mixing system 146 is activated by the controller to supplement the mixed fuel circulation supply loop 18 with fuel mixture by charging the mixed fuel bladder accumulator 36 inline the mixed fuel circulation supply loop 18.

If the pressure in the diesel bladder accumulator 158 or in the LPG bladder accumulator 188 falls below a pressure threshold as detected by the pressure sensors 156 and 186, then the booster pumps 154 and 178 are activated by the controller to charge the bladder accumulators 158 and 188 respectively with diesel and LPG respectively. It will be appreciated that with the configuration of the fuel-mixing system 146, the charging of bladder accumulators 158 and 188 can be independently controlled, that is the bladder accumulators can be charged prior to releasing diesel and LPG to the mixer 40.

The diesel and LPG are then mixed in the mixer 40 and passed to the mixed fuel circulation supply loop 18. The additional working and controlling of the dual fuel supply system 140 is essentially identical to that described above with reference to the dual fuel supply system 11 in FIG. 2.

Figure 5:
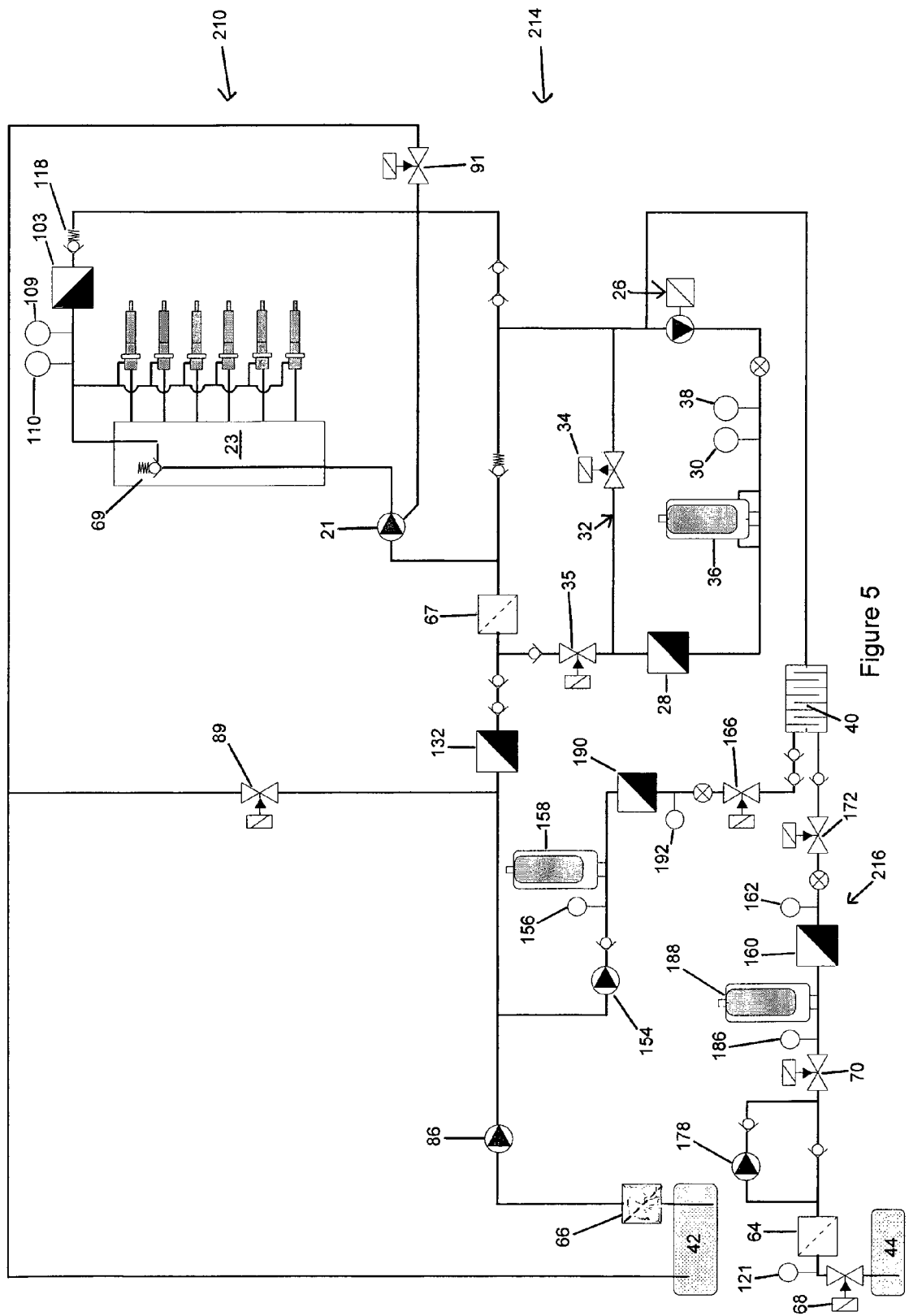
FIG. 5 is a schematic representation of a fourth embodiment of the dual fuel supply system that includes the third embodiment and additional system components.

FIG. 5 shows another embodiment of a dual fuel supply system 210 that is essentially identical to the dual fuel supply system 140 in FIG. 4, but includes a number of additional system components in the mixed fuel system 214. These additional components are similar to the additional components in the embodiment described with reference to FIG. 3.

The fuel-mixing system 216 is similar to the fuel-mixing system 146 in FIG. 4, but includes a few additional components such as fuel coolers 160 and 190 inline the LPG delivery line and the diesel delivery line respectively. Temperature sensors 162 and 192 are provided inline the LPG delivery line and the diesel delivery line downstream from their respective coolers 160 and 190. The temperature sensors 162 and 192 are installed in a way that the sensing tips of the sensor extend into the outlet of the fuel coolers.

Figure 6:
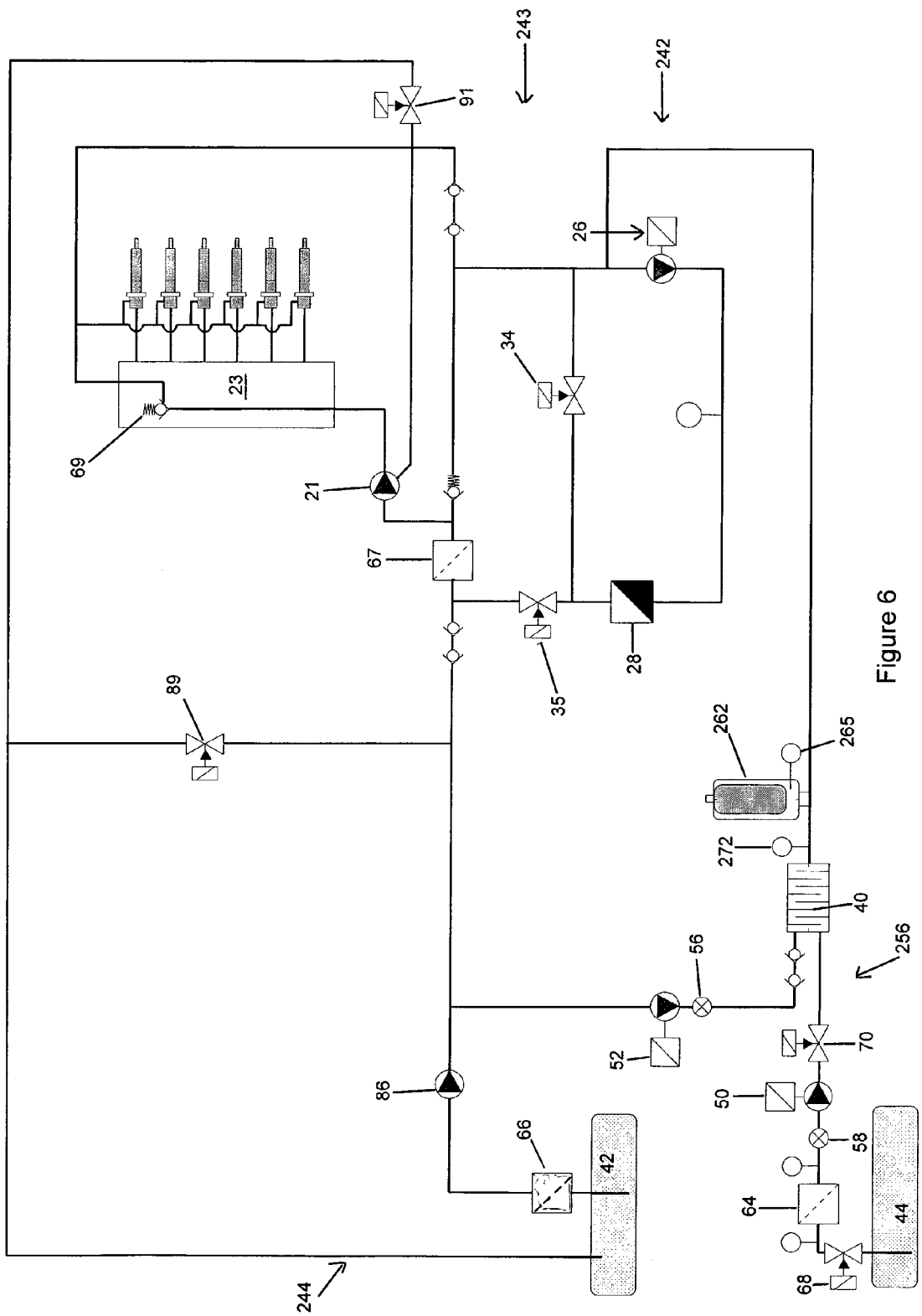
FIG. 6 is a schematic representation of a fifth embodiment of the dual fuel supply system.

FIG. 6 shows another embodiment of a dual fuel supply system 240, in accordance with the invention.

The dual fuel supply system 240 includes a mixed fuel supply system 243 and a diesel supply system 244.

The second stage 242 of the mixed fuel supply system 243 is substantially similar to the embodiments described with reference to FIGS. 2 to 5, in that it also includes a mixed fuel circulation supply loop 18, a mixed fuel bypass loop 32, a cooler 28 and a mixed fuel circulation pump 26 and solenoid valves 34 and 35. However, the mixed fuel bladder accumulator 262 is positioned inline the mixed fuel supply line 22 downstream of the mixer 40 but upstream of the pump 26 in which forms part of the mixed fuel circulation supply loop 18.

The fuel-mixing system 256 is substantially similar to the fuel-mixing system as described with reference to FIG. 2 and the diesel fuel system 244 is substantially identical to the diesel fuel system 80 as described with reference to FIG. 2.

Figure 7:
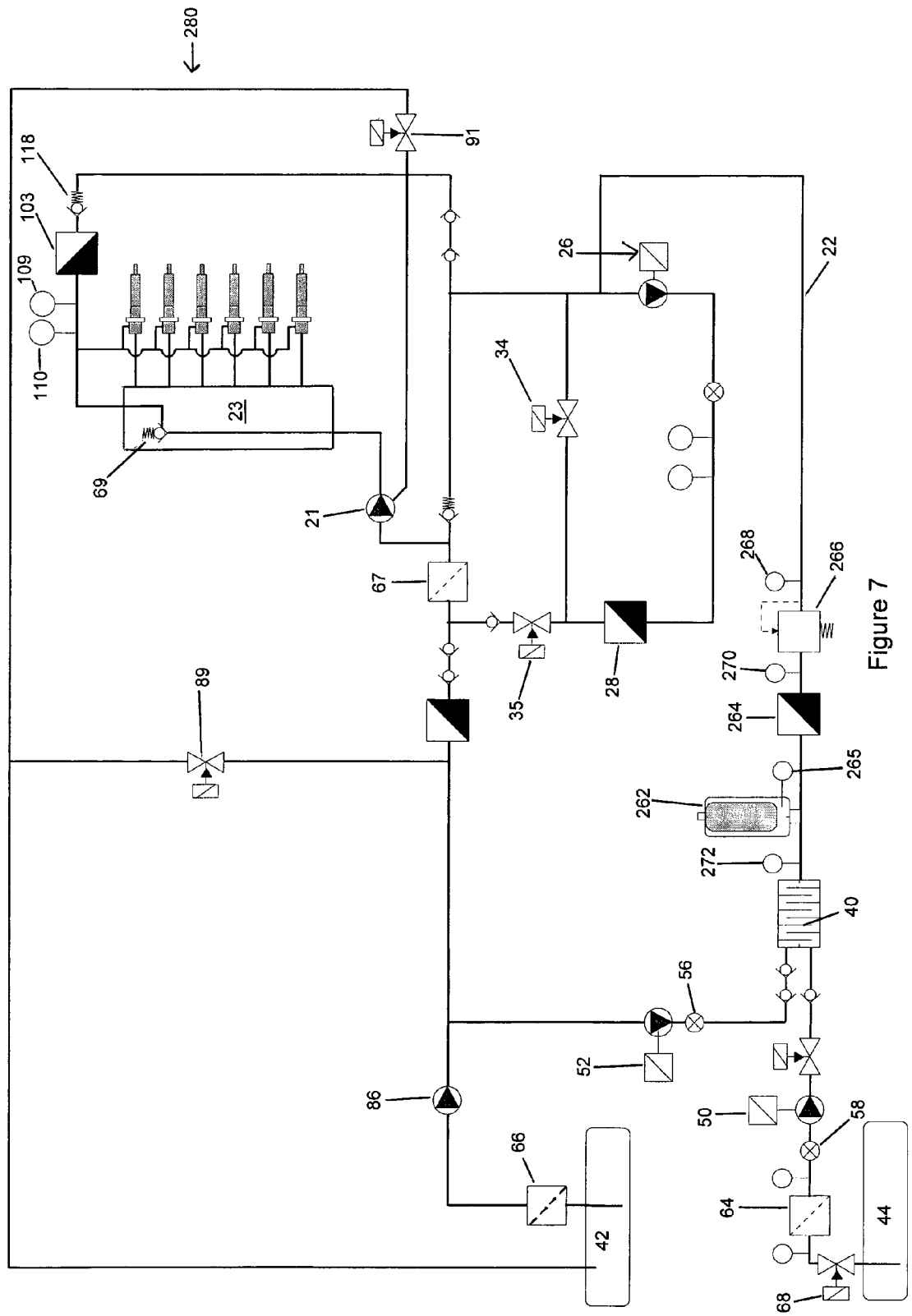
FIG. 7 is a schematic representation of a sixth embodiment of the dual fuel supply system that includes the fifth embodiment and addition system components.

FIG. 7 shows another embodiment of a dual fuel supply system 280 that is substantially similar to the dual fuel supply system 240 in FIG. 6, but includes a few additional system components.

A difference compared to the embodiments in FIGS. 2 to 5, is that a cooler 264 is provided inline the mixed fuel supply line 22 downstream from the mixed fuel bladder accumulator 262. Also, a pressure regulating valve 266 is positioned downstream from the cooler 264 inline the mixed fuel supply line 22.

The mixed fuel supply system 269 further includes associated pressure sensors 268 and 265 and temperature sensors 270 and 272 for use in controlling the pressure and temperature of the fuel mixture that is supplied to the mixed fuel circulation supply loop 18.

The pressure regulating valve 266 ensures that the pressure of the fuel mixture in the mixed fuel supply circulation loop 18 is within the required pressure demand range of the injection system 12, thus, the pressure towards the backend of the pressure regulating valve 266 is maintained at a pressure that is sufficiently high to maintain the liquid fuel mixture in a liquefied state, and therefore does not require the coolers in the diesel and LPG delivery lines. It will be appreciated that the addition of coolers in the diesel and LPG lines is nevertheless an optional feature.

Figure 8:
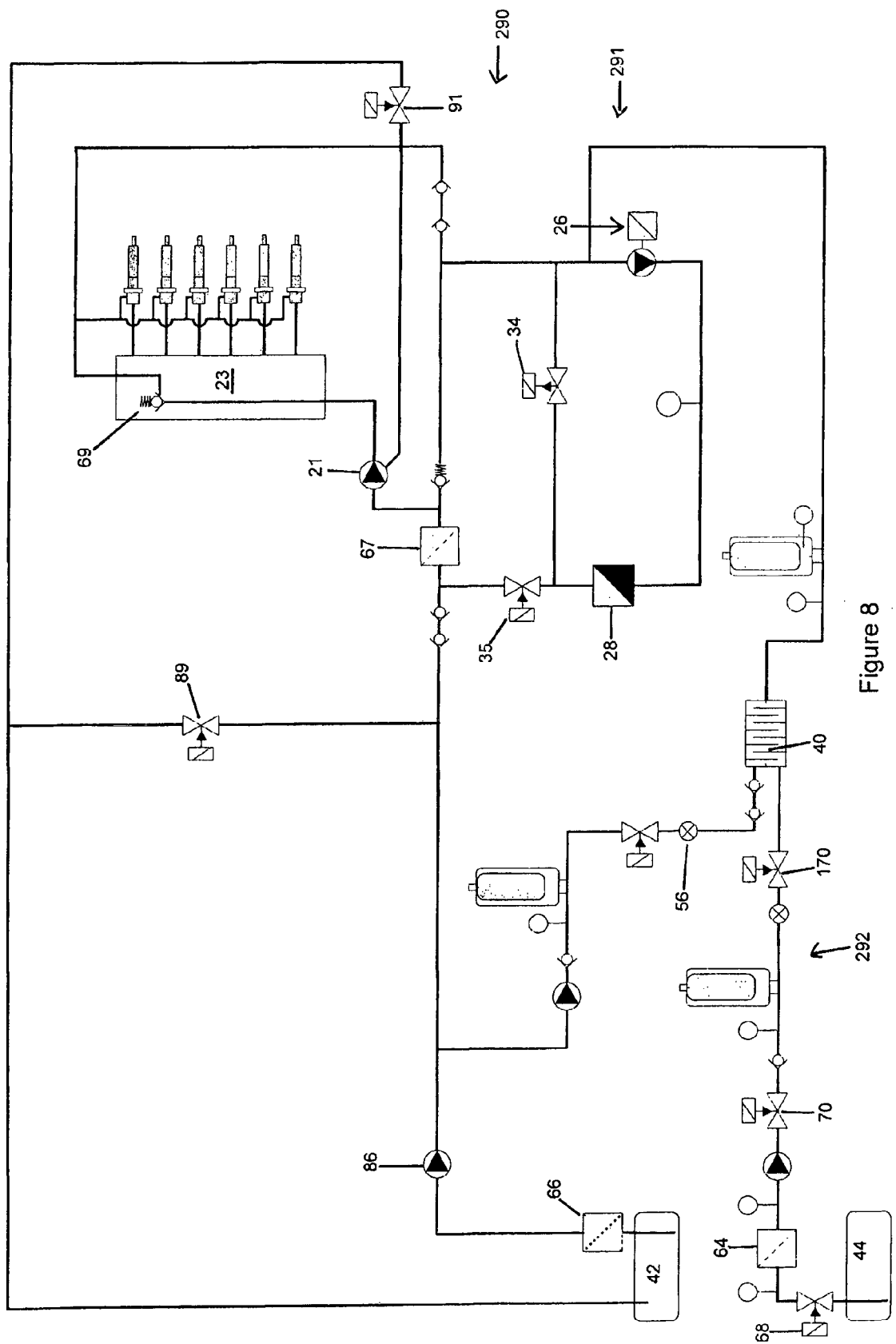
FIG. 8 is a schematic representation of a seventh embodiment of the dual fuel supply system.

FIG. 8 shows another embodiment of a dual fuel supply system 290 in accordance with the invention. The dual fuel supply system 290 includes a second stage of a mixed fuel supply system 291 that is substantially similar to the second stage of the mixed fuel supply system 242 described with reference to FIG. 6.

The dual fuel supply system 290 further includes a fuel-mixing system 292 that is substantially similar to the fuel-mixing system as described with reference to FIG. 4.

Figure 9:
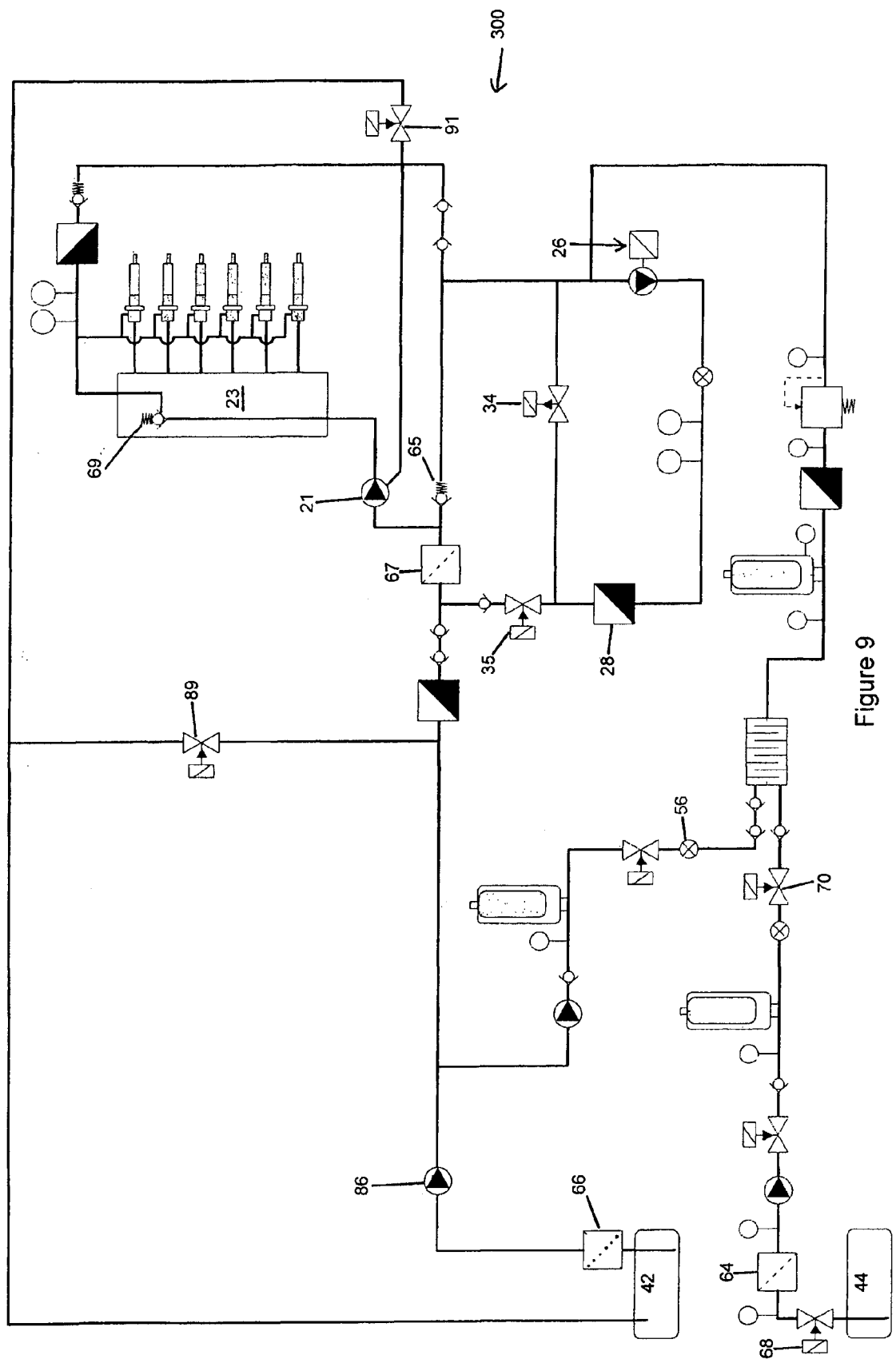
FIG. 9 is a schematic representation of an eighth embodiment of the dual fuel supply system that includes the seventh embodiment and additional system components.

FIG. 9 shows another embodiment of a dual fuel supply system 300 that is substantially similar to the dual fuel supply system in FIG. 8, but includes a few additional components in the second stage of the dual fuel supply system not unlike the second stage of the of dual fuel supply system 280 as described with reference to FIG. 7.

Advantages

The preferred embodiments of the dual fuel supply system for indirect-injection fuel systems has the advantage that the dual fuel supply system is able to supply either a fuel mixture or diesel only to the direct-injection system, and the fuel source can be selectively changed over between the two systems.

Another advantage of the preferred embodiments of the dual fuel supply system is that when the dual fuel supply system supplies diesel only to the direct-injection system, the diesel temperature is controlled to retain the fuel flow path of the engine at a temperature that is safe for the dual fuel supply system to switch over to the mixed fuel supply system without causing boiling of the liquid fuel mixture.

A further advantage of the preferred embodiments of the dual fuel supply system is that it is able to regulate the supply temperature of the diesel or the fuel mixture at a temperature that is sufficiently lower than the vapor temperature of the fuel mixture, so as to compensate for the introduction of heat into the fuel mixture by the engine, in use, so as to retain the fuel mixture below its vapor temperature at the fuel demand pressure.

Advantageously, the preferred embodiments of the mixed fuel supply system is designed to minimize the volume of the fuel mixture flow path, so as to minimize the amount for fuel mixture that is resident in the mixed fuel supply system when the dual fuel supply system supplies diesel only to the direct-injection system.

Also, the preferred embodiments of the dual fuel supply system is configured at least partly to flush the fuel mixture flow path with diesel after the fuel mixture is supplied to the second stage of the mixed fuel supply system and before the diesel engine is stopped.

The preferred embodiments of the dual fuel supply system also has the advantage that the diesel supply system, the first stage of the mixed fuel supply system, and the second stage of the mixed fuel supply system are independently controllable. In particular, the second stage of the mixed fuel supply system includes a pressure accumulator to buffer pressurized fuel mixture, and therefore separates continuous pressure control dependency from the first stage of the mixed fuel supply system and contributes to control stability during fuel demand fluctuation of the diesel engine.

Also, the preferred embodiments of the dual fuel system employs multiple fuel coolers within the sub-systems of the dual fuel supply system, which increase the temperature controllability of the fuels through the dual fuel supply system.

The preferred embodiments of the dual fuel supply system is also designed to use a substantial part of the existing fuel system components, and therefore reduces the modifications needed to equip a diesel engine with the dual fuel supply system.

Variations

It will of course be realized that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

The invention claimed is:

1. A dual fuel supply system for supplying fuel to a direct-injection system of a diesel engine, the dual fuel supply system including:
    a diesel supply system to supply diesel to the direct-injection system; and
    a mixed fuel supply system that is operatively able to supply a liquid fuel mixture of diesel and liquefied gaseous fuel to the direct-injection system at a supply pressure within a fuel demand pressure range of the direct-injection system and at a corresponding temperature range that retains the fuel mixture below its vapor temperature as it flows through the fuel path of the direct-injection system and the diesel engine, wherein
    the mixed fuel supply system further comprising a controller configured to regulate the supply pressure of the liquid fuel mixture within a pressure range towards a high end of the fuel demand pressure of the direct-injection system and configured to supply the fuel mixture at a supply temperature that is sufficiently lower than the vapor temperature of the liquid fuel mixture at the supply pressure to compensate for heat that is introduced into the liquid fuel mixture by engine heat as it flows through the fuel path of the direct-injection system and the diesel engine and wherein
    the dual fuel supply system is configured to permit selective change over between the diesel supply system and the mixed fuel system to supply the direct-injection system selectively with either diesel or liquid fuel mixture respectively, and
    the controller is configured to control selectively the change over between the diesel supply system and the mixed fuel supply system.

2. A dual fuel supply system as claimed in claim 1, wherein the diesel supply system is operatively able to supply diesel to the direct-injection system at a supply pressure within the fuel demand pressure range of the direct-injection system and at a supply temperature range that corresponds with the supply temperature range of the mixed fuel supply system.

3. A dual fuel supply system as claimed in claim 1, wherein the mixed fuel supply system includes a first stage and a second stage, and the second stage of the mixed fuel supply system is configured to regulate the supply pressure and the supply temperature at which the liquid fuel mixture is supplied to the direct-injection system.

4. A dual fuel supply system as claimed in claim 3, wherein the mixed fuel supply system is configured to trigger the first stage of the mixed fuel supply system to supply liquid fuel mixture to the second stage of the mixed fuel supply system when the supply pressure in the second stage of the mixed fuel supply system drops towards a low end of the fuel demand pressure range of the direct-injection system.

5. A dual fuel supply system as claimed in claim 3, wherein the mixed fuel supply system includes a pressure accumulator, and the first stage of the mixed fuel supply system is triggered to charge the pressure accumulator with fuel mixture when the supply pressure in the second stage of the mixed fuel supply system drops towards a low end of the fuel demand pressure of the direct-injection system.

6. A dual fuel supply system as claimed in claim 3, wherein the second stage of the mixed fuel supply system includes a mixed fuel supply circulation line that defines a mixed fuel supply circulation flow path that is connected or connectable inline in flow circulation with a high pressure pump and a fuel rail of the direct-injection system.

7. A dual fuel supply system as claimed in claim 3, wherein an overflow line of the high pressure pump of the direct-injection system is connected in flow communication with the mixed fuel supply circulation line.

8. A dual fuel supply system as claimed in claim 3, wherein the mixed fuel supply circulation line defines a mixed fuel supply circulation flow path that has a flow path volume to accommodate at least the amount of liquid fuel mixture that the diesel engine consumes at full load for one minute.

9. A dual fuel supply system as claimed in claim 3, wherein the second stage of the mixed fuel supply system includes a circulation pump inline the mixed fuel supply circulation line.

10. A dual fuel supply system as claimed in claim 3, wherein the second stage of the mixed fuel supply system includes at least one fuel cooler inline the mixed fuel supply circulation line upstream from the direct injection-system and downstream from the circulation pump, the second stage of the mixed fuel supply system also includes a temperature sensor upstream from the direct-injection system to measure the supply temperature of the liquid fuel mixture that is supplied to the direct-injection system; the second stage of the mixed fuel supply system includes a flow sensor to measure a flow rate of liquid fuel mixture circulating through the mixed fuel supply circulation line.

11. A dual fuel supply system as claimed in claim 3, wherein there is a temperature sensor downstream from the direct-injection system to measure a temperature of the liquid fuel mixture that discharges from the direct-injection system into the mixed fuel supply circulation line.

12. A dual fuel supply system as claimed in claim 3, wherein the second stage of the mixed fuel supply system includes a fuel mixer inline the mixed fuel supply circulation line, said fuel mixer defines a mixing chamber that is in flow communication with the mixed fuel circulation supply flow path.

13. A dual fuel supply system as claimed in claim 3, wherein the fuel-mixing system is configured to regulate a ratio of diesel to liquefied gaseous fuel of the liquid fuel mixture that is supplied to the second stage of the mixed fuel supply system at a ratio of between 10% and 50% parts per mass diesel to 90% and 50% parts per mass liquefied gaseous fuel.

14. A dual fuel supply system as claimed in claim 3, wherein the controller is configured to flush the mixed fuel supply line with diesel before switching over from the mixed fuel supply system to the diesel system.

15. A dual fuel supply system as claimed in claim 3, wherein the controller is configured to flush the mixed fuel supply line with diesel after the fuel-mixing system is charged by the first stage of the mixed fuel supply system with liquid fuel mixture.

16. A dual fuel supply system as claimed in claim 3, wherein the controller is configured to flush the mixed fuel supply line with diesel before the diesel engine is stopped.

17. A dual fuel supply system as claimed in claim 3, wherein the controller is configured to regulate the flow rate of the fuel mixture through the mixed fuel cooler to regulate the temperature of the fuel mixture.

18. A dual fuel supply system as claimed in claim 3, wherein the controller is configured to open the diesel supply circulation line prior to opening the mixed fuel bypass line, and the controller is configured to open the mixed fuel supply circulation line prior to opening the diesel bypass line.

19. A dual fuel supply system as claimed in claim 3, wherein the controller is configured automatically to change over from the mixed fuel supply system to the diesel supply system when the pressure in the mixed fuel supply circulation loop drops below a set pressure threshold.

20. A dual fuel supply system as claimed in claim 3, wherein the controller is configured to regulate a temperature of the liquefied gaseous fuel and the diesel fuel prior to mixing at temperatures that are sufficiently lower than the vapor temperature of the liquefied gaseous fuel at the mixing pressure, to compensate for heat that is added to the fuel mixture during mixing and when flowing to the mixed fuel supply circulation line; the controller is configured to monitor the temperature of the liquid fuel mixture in the mixed fuel supply circulation line, and to switch over to the diesel supply system if the temperature rises above a set temperature threshold; the controller is configured to monitor the temperature in the mixed fuel bypass loop and if the temperature of the liquid fuel mixture in the mixed fuel bypass loop is above a set temperature threshold then to resist switching over from the diesel supply system to the mixed fuel supply system.

21. A dual fuel supply system as claimed in claim 3, wherein the controller is configured to monitor the supply temperature of the diesel and if the supply temperature of the diesel is above a set temperature threshold then to resist change over to the mixed fuel supply system.

22. A dual fuel supply system as claimed in claim 3, wherein the controller is configured to alter the ratio of diesel to liquefied gaseous fuel to alter the vapor temperature of the fuel mixture at the supply pressure.

* * * * *